Oct. 13, 1931.  J. P. BENOIT  1,827,698
GLASSWARE FORMING MACHINE
Filed June 27, 1930   2 Sheets-Sheet 1
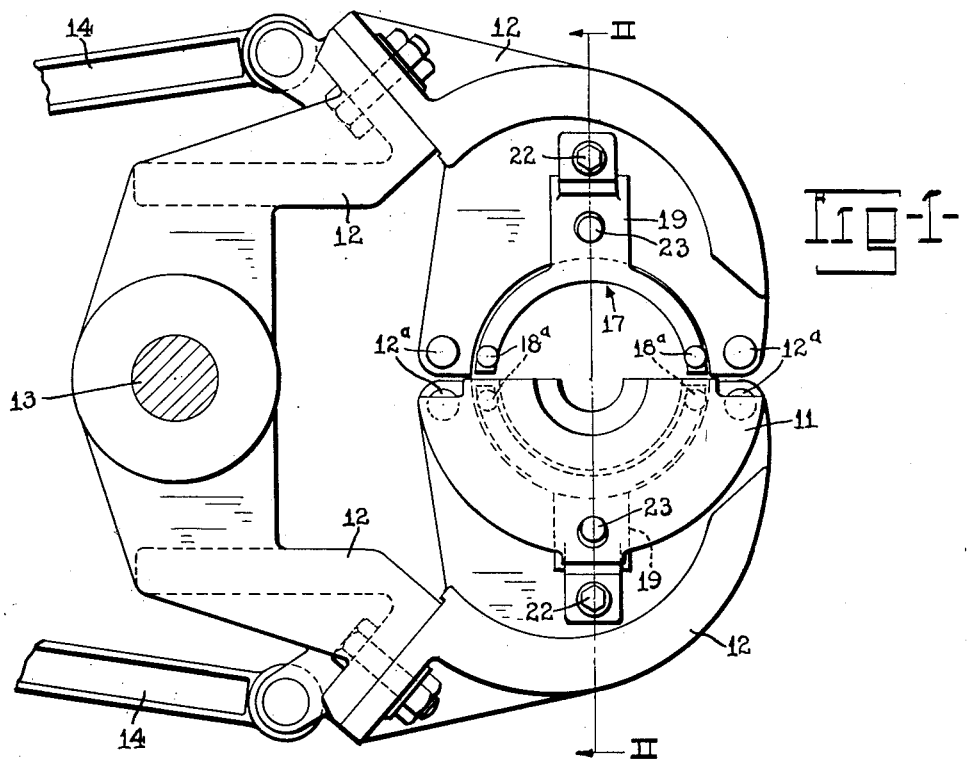
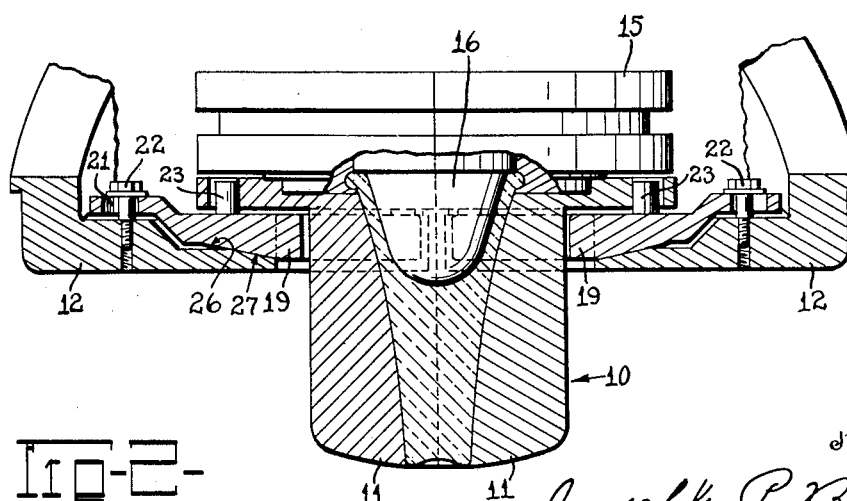
Inventor
Joseph P. Benoit
By
J. F. Rule
Attorney Oct. 13, 1931.  J. P. BENOIT  1,827,698
GLASSWARE FORMING MACHINE
Filed June 27, 1930  2 Sheets-Sheet 2
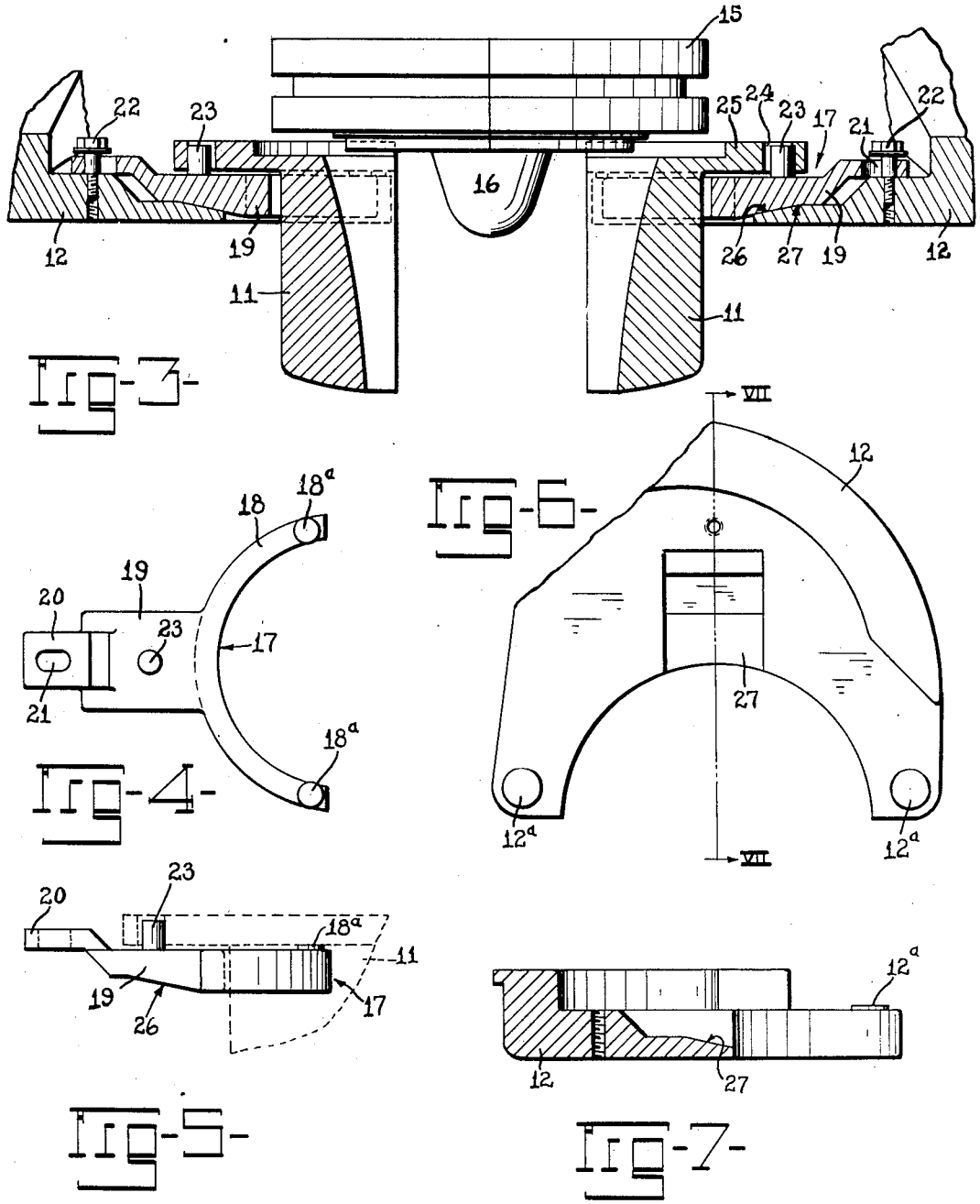
Inventor
Joseph P. Benoit
By J. F. Rule, Attorney Patented Oct. 13, 1931

1,827,698

UNITED STATES PATENT OFFICE

JOSEPH P. BENOIT, OF ALTON, ILLINOIS, ASSIGNOR TO OWENS-ILLINOIS GLASS COMPANY, A CORPORATION OF OHIO

GLASSWARE FORMING MACHINE

Application filed June 27, 1930. Serial No. 464,363.

The present invention relates to improvements in machines for forming hollow glassware and more particularly to the mold carrier construction.

One type of machine includes a series of partible blank molds adapted to be brought in succession into contact with the surface of a supply body of molten glass for the purpose of obtaining mold charges. Cooperating with each blank mold is a neck mold which forms the finish and neck portion of the article of glassware being produced. Just before the molds are brought into contact with the molten glass the blank mold is closed and thereby moved into a position in register with the corresponding neck mold. While the open lower end of the blank mold is in contact with the glass, vacuum is applied to the blank and neck mold cavities to thereby raise a measured quantity of glass into said cavities. In this manner the article of glassware being produced is given its initial shape, preparatory to being placed in a finishing mold wherein said article is expanded to its finished form. Frequently, due to improper engagement between the adjacent surfaces of the blank and neck molds, outside air leaks into the mold cavities during the mold charging operation. This results in partial filling of the molds and, therefore, the formation of a blank or parison which is underweight and frequently distorted in one respect or another. Such conditions very often result in the production of an article of glassware which cannot be marketed because it does not contain sufficient glass to withstand ordinarily rough usage. Accordingly, such articles must be discarded. The leakage of air is also objectionable because of waste of power, lowering of the vacuum, and slowing down of production.

The present invention has for its main object the provision of improved means for bringing the neck and blank molds into cooperative relation, such means insuring positive sealing engagement between the molds so that loss of vacuum due to ingress of air between the molds is entirely avoided. To this end my improvement provides novel means for lifting the blank mold into snug contact with the corresponding neck mold immediately after the blank mold has completely closed and just prior to engagement between the mold and supply body of molten glass.

A further object is the provision of novel means of the above character, capable of embodiment in glassware forming machines now in use without requiring extensive alteration or replacement of standard parts.

Other objects will be in part apparent and in part pointed out hereinafter.

In the accompanying drawings:

Fig. 1 is a fragmentary plan view illustrating the application of my invention to a partible blank mold.

Fig. 2 is a sectional elevation taken substantially along the line II—II of Fig. 1, showing blank mold closed.

Fig. 3 is a view similar to Fig. 2 showing the blank mold open and spaced downwardly a short distance from the corresponding neck mold.

Fig. 4 is a detail plan view of one of the blank mold section supporting arms.

Fig. 5 is a side elevation thereof.

Fig. 6 is a fragmentary plan view of a standard type blank mold arm modified in accordance with the present invention.

Fig. 7 is a sectional view taken substantially along the line VII—VII of Fig. 6.

In the drawings, illustrating the preferred embodiment of my invention, the partible blank mold 10 of which there may be an annular series, is composed of two sections 11 suitably supported on blank mold arms 12 connected to a vertical hinge pin 13 about which said arms may oscillate to alternately open and close said blank mold. Connector bars 14 or links, are pivoted at one end to the mold arms 12 and at the other end to suitable mechanism (not shown), for alternately opening and closing the mold. A neck mold 15 individual to the blank mold 10 is arranged in a plane above the latter and in such position that it registers with the blank mold during a predetermined portion of each cycle of operations. A plunger 16 cooperates with the neck mold in forming the finish on the article of glassware being produced, and in addition, provides an initial blow opening in the upper end of the blank or parison into which blowing air is injected during the final blowing operation in the finishing mold (not shown). During gathering of a mold charge the open lower end of the blank mold 10 is in contact with the surface of a supply body of molten glass (not shown) and vacuum is applied to the blank and neck mold cavities. In order to insure against loss of vacuum due to leakage of air into the molds between the horizontal meeting faces thereof, and consequent partial filling of said cavities with molten glass, the present invention provides means whereby the blank mold 10, immediately upon being completely closed, and prior to dipping into the glass, is moved vertically upward sufficiently to cause a positive seal between the meeting surfaces of said molds. This is accomplished by a construction substantially as will now be set forth.

Each blank mold section 11 is directly connected to a holder 17 (Figs. 3, 4, and 5) which is mounted upon one of the mold arms 12 for movement along an inclined path upon said arm, at times, as will be described presently. Each holder 17 comprises an arcuate bar 18 connected midway its length to a cam plate 19 which is formed at its outer end with a slotted finger 20. Through a vertical slot 21 in said finger, an attaching bolt 22 or screw extends, to provide connection between said holder and the corresponding blank mold arm 12. An upstanding stud 23 on the cam plate 19 projects into an opening 24 in the horizontal flange 25 provided at the upper end of the blank mold section 11. Thus, connection is provided between the blank mold sections 11 and the mold arms 12 so that they move as a unit about the axis of the hinge pin 13. An inclined cam surface 26 is formed on the lower side of the cam plate 19 and constantly contacts with a similarly formed cam surface 27 provided on the upper side of the blank mold arm 12. A major portion of the cam plate 19 slidingly fits in an upwardly opening channel, the bottom of which constitutes the cam surface 27. Thus, the holders 17 are held against lateral movement and are positively guided along the desired path while moving relative to the mold arms 12.

Pads 12ª formed on each blank mold arm 12 support the blank mold until it begins its upward movement for intimate contact with the corresponding neck mold 15. Pads 18ª (Fig. 4) on the holder 17 have supporting engagement with the corresponding blank mold sections during upward movement of the latter and while said sections contact with the neck mold sections.

In operation, the blank mold sections 11 are brought together by movement of the arms 12, prior to reaching the mold charging station so that together with neck mold 15 there is provided means for gathering a mold charge and giving it the desired shape of the blank or parison. Considerable pressure is applied to the blank mold sections through the arms 12 to insure sealing contact between the abutting or sealing surfaces of the blank mold sections to prevent vacuum leakage along these surfaces and to reduce to a minimum any irregular surface formation in the blank adjacent the parting line of the blank mold. In the event initial closing of the blank mold does not also cause positive sealing contact between said blank mold and the corresponding neck mold, as is essential in obtaining proper operating conditions, the blank mold is moved vertically upward due to relative movement between the inclined cam surfaces 26 and 27 on the holders and arms, causing snug sealing contact between the blank and neck molds. By constant exertion of pressure on the blank mold arms 12 so that they tend to move inwardly after the blank mold is completely closed, sealing contact between the adjacent surfaces of the blank and neck molds may be obtained and positively maintained. With the above described conditions it is evident that leakage of vacuum due to improper engagement between the blank and neck molds will be avoided and the blank and neck mold cavities may therefore be completely filled with molten glass. Accordingly, glassware of uniform weight and quality may be produced.

Modifications may be resorted to within the spirit and scope of the appended claims.

What I claim is:

1. In combination, a neck mold, a partible two section blank mold arranged in a plane below the neck mold, a pair of holders for the blank mold sections, a pair of blank mold arms supporting the holders and movable to alternately open and close the mold and thereby periodically place the latter in register with the neck mold, and connection between the holders and arms whereby movement of the arms causes upward movement of the closed blank mold into sealing contact with the neck mold.

2. In combination, a neck mold, a partible two section blank mold arranged in a plane below the neck mold, holders individual to the blank mold sections, a pair of blank mold arms supporting the holders and blank mold sections, and means whereby mold closing movement of said arms causes relative horizontal movement between said arms and holders, the mold arms and holders having contacting cam surfaces so arranged that said relative horizontal movement also moves the holders and blank mold sections upwardly causing sealing contact between the latter and the neck mold.

3. In combination, a neck mold, a partible two section blank mold arranged in a plane below the neck mold, holders individual to the blank mold sections, a pair of blank mold arms supporting the holders and blank mold sections, means whereby mold closing movement of said arms causes relative horizontal movement between said arms and holders, the mold arms and holders having contacting cam surfaces so arranged that said relative horizontal movement also moves the holders and blank mold sections upwardly causing sealing contact between the latter and the neck mold, and means for causing said relative horizontal movement of the mold arms and holders to follow a predetermined path.

4. In combination, a neck mold, a partible two section blank mold arranged in a plane below the neck mold, holders individual to the blank mold sections, a pair of blank mold arms supporting the holders and blank mold section, means whereby mold closing movement of said arms causes relative horizontal movement between said arms and holders, means whereby said relative movement of the mold arms and holders results in upward movement of the blank mold sections into contact with the neck mold, and means for positively guiding the holders in a predetermined path on the mold arms during said movement.

5. In combination, a partible two section blank mold, a pair of blank mold arms adapted to alternately open and close the blank mold, and cam devices mounted on the upper sides of the arms for imparting vertical movement to the mold after the latter has been closed and while said arms continue their mold closing movement.

6. In combination, a neck mold, a partible two section blank mold arranged in a plane below the neck mold, a horizontally disposed flange at the upper end of each mold section, said flange having a vertical opening therein, a holder for each mold section having a stud extending upwardly through the corresponding opening, mold arms supporting the holders and mold sections and operative to alternately open and close the mold, and means whereby the movement of the mold arms inwardly beyond the point necessary to close the blank mold causes upward movement of the holders and blank mold section, bringing said mold sections and neck molds into sealing contact with one another.

7. In combination, a neck mold, a partible two section blank mold arranged in a plane below the neck mold, a horizontally disposed flange at the upper end of each mold section, said flange having a vertical opening therein, a holder for each mold section having a stud extending upwardly through the corresponding opening, mold arms supporting the holders and mold sections and operative to alternately open and close the mold, means whereby the movement of the mold arms inwardly beyond the point necessary to close the blank mold causes upward movement of the holders and blank mold sections, bringing said mold sections and neck molds into sealing contact with one another, and means whereby said relative movement between the mold arms and holders follows a definite predetermined path.

Signed at Alton, Illinois, this 20th day of June, 1930.

JOSEPH P. BENOIT.